United States Patent
Jaycobs et al.

(10) Patent No.: US 12,051,109 B2
(45) Date of Patent: *Jul. 30, 2024

(54) BINARY OPTIONS ON SELECTED INDICES

(71) Applicant: CFPH, LLC, New York, NY (US)

(72) Inventors: Rich Jaycobs, Burlington, MA (US); Thomas D. Bradshaw, New York, NY (US); Jason Poulos, Commack, NY (US)

(73) Assignee: CFPH, LLC, New York, NY (US)

( * ) Notice: Subject to any disclaimer, the term of this patent is extended or adjusted under 35 U.S.C. 154(b) by 1052 days.

This patent is subject to a terminal disclaimer.

(21) Appl. No.: 16/926,962

(22) Filed: Jul. 13, 2020

(65) Prior Publication Data
US 2020/0410592 A1    Dec. 31, 2020

Related U.S. Application Data (63) Continuation of application No. 15/159,775, filed on May 19, 2016, now Pat. No. 10,713,718.

(60) Provisional application No. 62/163,375, filed on May 19, 2015.

(51) Int. Cl.
*G06Q 40/04* (2012.01)
*G06Q 30/08* (2012.01)
*G06Q 40/06* (2012.01)
*G06Q 50/18* (2012.01)

(52) U.S. Cl.
CPC ............ *G06Q 40/04* (2013.01); *G06Q 30/08* (2013.01); *G06Q 40/06* (2013.01); *G06Q 50/18* (2013.01)

(58) Field of Classification Search
CPC ........ G06Q 40/00; G06Q 40/02; G06Q 40/04; G06Q 40/06; G06Q 30/00; G06Q 30/06; G06Q 30/08
USPC ..................................................... 705/35–37
See application file for complete search history.

(56) References Cited

U.S. PATENT DOCUMENTS

| | | |
|---|---|---|
| 7,779,466 B2 | 8/2010 | Judge |
| 8,630,938 B2 | 1/2014 | Cheng |
| 2002/0099640 A1 | 7/2002 | Lange |
| 2002/0147670 A1 | 10/2002 | Lange |
| 2003/0115128 A1 | 6/2003 | Lange |
| 2003/0225658 A1 | 12/2003 | Waley et al. |
| 2004/0139031 A1 | 7/2004 | Amaitis et al. |
| 2005/0165669 A1 | 7/2005 | Montanaro |
| 2006/0253355 A1 | 11/2006 | Shalen et al. |
| 2012/0221456 A1 | 8/2012 | Lutnick |
| 2012/0254062 A1 | 10/2012 | Labsuzewski |
| 2013/0246305 A1 | 9/2013 | Speth |
| 2013/0275287 A1 | 10/2013 | Graetz |
| 2014/0244466 A1 | 8/2014 | Jaycobs |
| 2017/0053350 A1 | 2/2017 | Jaycobs |
| 2017/0076370 A1 | 3/2017 | Genzer |

OTHER PUBLICATIONS

PCT First Notice Informing the Applicant of the Communication of the International Application for PCT/US2016033377 dated Dec. 22, 2016; 1 page.

*Primary Examiner* — Hani M Kazimi (57) ABSTRACT

Various embodiments comprise systems, methods, and computer-readable media for configuring and trading binary options. A first index may be configured, e.g., based on a portfolio configured by a user. One or more second indices may be determined. A binary option may pay out if the first index outperforms the one or more second indices, e.g., over a period of time. The binary option may be traded in the primary and secondary markets.

20 Claims, 3 Drawing Sheets

BINARY OPTIONS ON SELECTED INDICES

CROSS-REFERENCE TO RELATED APPLICATIONS

This application is a continuation of U.S. patent application Ser. No. 15/159,775 filed May 19, 2016 which claims the benefit of U.S. Provisional Application Ser. No. 62/163,375 filed May 19, 2015, the disclosures of which are incorporated herein by reference in their entireties.

FIELD OF THE INVENTION

Some embodiments may relate to trading binary options. For example, some embodiments may relate to trading binary options including multiple indices (that is, more than one index) that may be compared, e.g., based on relative rates of return.

BACKGROUND

Binary options may be traded. In some binary options systems, a binary option may have two sides, analogous to a buy side and a sell side. The binary option may have a value determined based on a future event. If the future event occurs, the binary option may pay out a fixed amount. If the future event does not occur, the binary option may pay out nothing at all.

DETAILED DESCRIPTION OF EXEMPLARY EMBODIMENTS

Various embodiments comprise systems, methods, and computer-readable media for configuring and trading binary options. A first index may be configured, e.g., based on a portfolio configured by a user. One or more second indices may be determined. A binary option may pay out if the first index outperforms the one or more second indices, e.g., over a period of time. The binary option may be traded in the primary and secondary markets.

Exemplary System

Figure 1:
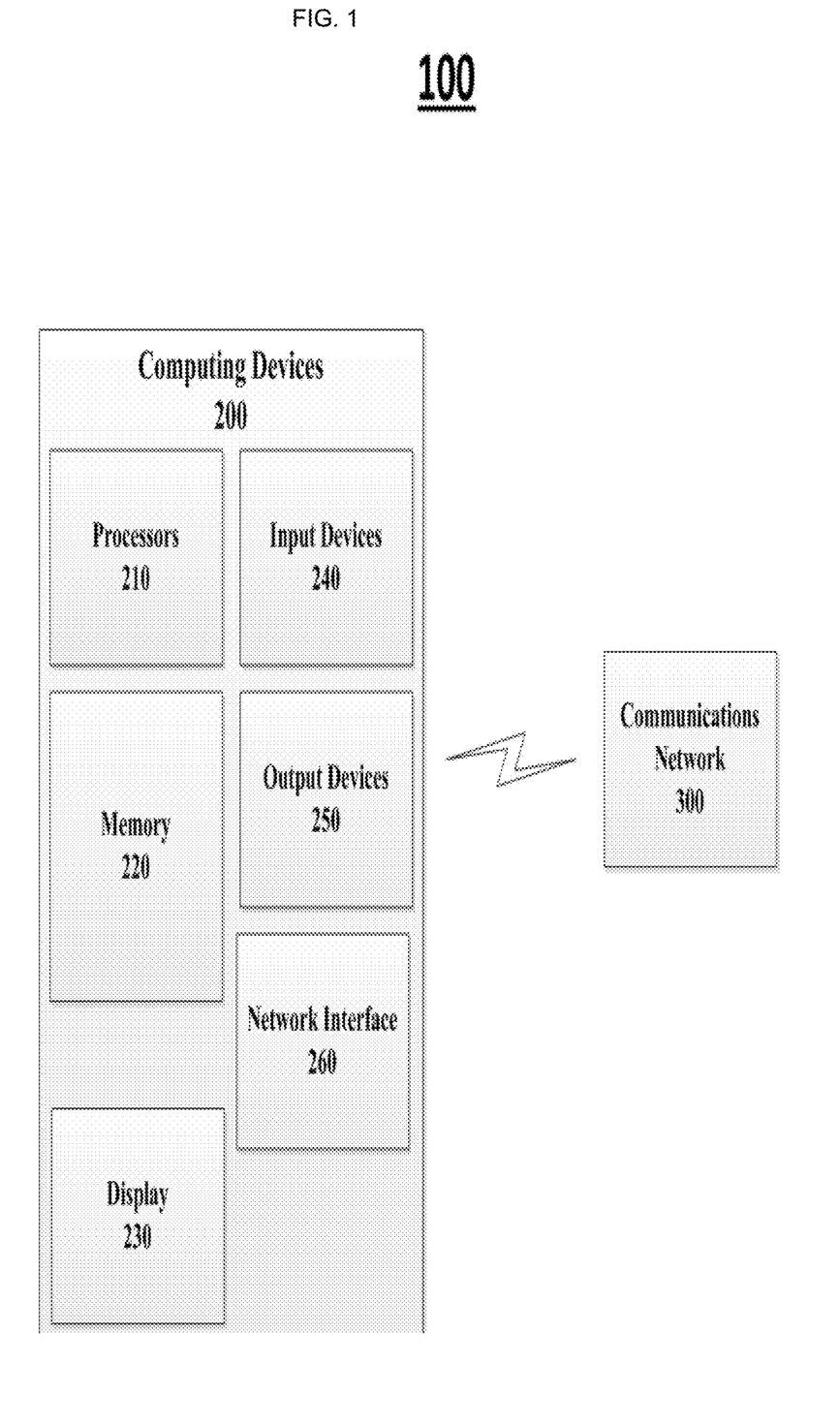
FIG. 1 depicts an exemplary system according to at least one embodiment of the systems disclosed herein.

FIG. 1 depicts an exemplary system according to at least one embodiment of the systems disclosed herein.

As shown in FIG. 1, a system 100 is provided in accordance with an aspect of the present disclosure. System 100 includes a plurality of computing devices 200 disposed in communication with one another either directly or via a network 300. Computing devices 200 may include, for example, trading terminals, electronic exchanges, servers, personal desktop computers, mobile devices, or other similar devices. Mobile devices may include, for example, smartphones, PDA's, tablets, smart watches, wearable computing devices, etc., Each computing device 200 may include at least one processor 210, memory 220, a display 230, one or more input devices 240, one or more output devices 250, a network interface 260, and other similar components. Each computing device 200 need not include every component mentioned above. Computing devices 200 may also or alternatively include additional components other than those mentioned above that are commonly found in computing devices.

Memory 220 stores instructions 222 and data 224 for use by the at least one processor 210. The memory 220 accessed by the at least one processor 210 may be located within the same device as the at least one processor 210 or may be located separate from the at device including the at least one processor 210 and disposed in communication with the at least one processor 210, for example, via network 300. For example, memory 220 may be part of a data server array which is accessed by a computing device that is remote from the server array. Instructions 222 may be stored in memory 220 and executable by the at least one processor 210 to cause processors 210 to perform a particular function. In this manner computing devices 200 may be programmed as special purpose computers. Data 224 may be stored, retrieved, or manipulated by processors 210 as needed. For example, memory 220 may include data 224 stored thereon relating to market information, bids and offers submitted by traders, trader profiles, execution and settlement details, trading algorithms, or other similar data. Memory 220 may be of any type capable of storing information accessible by processor 210.

Instructions 222 may be any set of instructions to be executed directly (such as machine code) or indirectly (such as scripts) by one or more of processors 210. In that regard, the terms "instructions," "steps" and "programs" may be used interchangeably herein. The instructions may be stored in object code form for direct processing by the processor, or in any other computer language including scripts or collections of independent source code modules that are interpreted on demand or compiled in advance. Functions, methods and routines of the instructions are explained in more detail below.

Data 224 may be retrieved, stored or modified by processor 210 in accordance with the instructions 222. For instance, although the present disclosure is not limited by any particular data structure, the data may be stored in computer registers, in a relational database as a table having a plurality of different fields and records, XML documents, or flat files. The data also may be formatted in any computer readable format such as, but not limited to, binary values, ASCII or Unicode. Moreover, the data may comprise any information sufficient to identify the relevant information, such as descriptive text, proprietary codes, pointers, references to data stored in other memories (including other network locations) or information which is used by a function to calculate the relevant data.

Although the processor and memory are functionally illustrated in FIG. 1 within the same block, it will be understood by those of ordinary skill in the art that the processor and memory may actually comprise multiple processors and memories that may or may not be stored within the same physical housing. For example, some of the instructions and data may be stored on removable disk, CD-ROM, USB stick, removable hard-drive, or other removable media, and others may be stored within a read-only computer chip or on a fixed hard-drive attached to the computing device. Some or all of the instructions and data may be stored in a location physically remote from, yet still accessible by, the processor via network 300. Similarly, the processor may actually comprise a collection of processors which may or may not operate in parallel.

Display 230 may include any display commonly found either included with or attached to a computing device. For example, display 230 include a standalone device attached to a personal desktop computer or trader terminal, may be incorporated as part of an all-in-one computer, tablet or smart phone, may be part of a wearable item such as a watch, or may be any other type of display. Display 230 may be touch sensitive an act as an input. Display 230 may be an LCD display, plasma display, LED display, CRT display, or any other type of display commonly used with computing devices. Computing devices 200 may generate graphic user interfaces that may be displayed on display 230. For example, instructions 222 may configure the at least one processor 210 to cause a display of a graphic user interface providing information to a user of computing device 200.

Input devices 240 may include any commonly used input device including, for example, a mouse, keyboard, touch screen, augment reality spectacles, a motion sensor, a heat sensor, laser, scanner, microphone, or any other input device that is configured to receive inputs from a user of the computing device 200.

Output devices 250 may include any output device such as display 230, a vibration feedback, speakers, augmented reality devices such as Google Glass™ and Oculus Rift™, or other any other output device that is configured to provide outputs to a user of the computing device 200.

Network interface 260 may be configured for wired or wireless communication and may include, for example, a wired modem, a wireless modem, a Bluetooth device, a Wi-Fi device, or any other the components used for connecting computing devices to one another or interfacing with communications network 300. Network device 260 may interface with the Internet.

Communications network 300 may include servers, routers, network hubs, switches, intranets, virtual private networks, wide area networks, local area networks, the Internet, private networks, or any other network or network device configured to allow provide communications between computing devices 200. For example, the network device 260 for each computing device 200 may interface with communications network 300 to provide communication between computing devices 200. Communications network 300 may comprise various configurations and protocols proprietary to one or more companies including, for example, Bluetooth, Ethernet, Wi-Fi, HTTP, or other similar protocols.

Although certain advantages are obtained when information is transmitted or received over communications network 300, other aspects of the invention are not limited to any particular manner of transmission of information. For example, in some aspects, the information may be sent via a non-transitory medium such as a disk, tape, CD-ROM, DVD, Blueray™, USB stick, or other similar mobile memory devices. In other aspects, the information may be transmitted in a non-electronic format and manually entered into the system. Yet further, although some functions are indicated as taking place on a server and others on a client, various aspects of the invention may be implemented by a single computer having a single processor.

The data 224 may also include a database 226. Database 226 provides market data 228 to client devices 280 in response to requests for information associated with a particular binary options instrument. The system and method is not limited to a specific manner of expressing the binary options market data.

Binary Options

In an aspect of the present disclosure, a binary option may be created and traded on system 100. The binary option may comprise a first index, a second index, a period of time, and a selected future outcome (e.g., a selection of whether the first index or the second index will have a greater rate of return over the period of time). The outcome of the binary option may be determined by comparing the rate of return of the first index to the rate of return of the second index for the period of time. For example, the value of the first index at the end of the period of time may be divided by the value of the first index at the beginning of the period of time to determine a rate of return for the first index. Likewise, the value of the second index at the end of the period of time may be divided by the value of the second index at the beginning of the period of time to determine a rate of return for the second index. The determined rate of return for the first index and the second index may be compared to determine which index has a greater rate of return for the period of time.

In some embodiments, the first index may comprise any number of trading products in any quantities. In some embodiments, the first index may include a predetermined number of financial instruments (or a number up to a predetermined maximum, such as 10). For example, the first index may include ten financial instruments. For example, the first index may include stocks or bonds from IBM, Apple, Microsoft, Google, Yahoo, Facebook, or any other financial instrument. The financial instruments may be any type of financial instrument, e.g., stocks, corporate bonds, treasuries, etc. The financial instruments included in the first index may all be of the same type, e.g., all stocks, all bonds, etc., or the first index may include various types of financial instruments, e.g., three stocks, three bonds, etc. There may alternatively be fewer than ten financial instruments or greater than ten financial instruments in the first index. The financial instruments to be included in the first index may be predetermined by system 100. The financial instruments to be included in the first index may alternatively be selected by a trader (or other user of system 100). For example, a trader may select ten financial instruments for inclusion in the first index, and may submit the first index to system 100. A trader may select the financial instruments and submit the index using a graphic user interface of system 100. The first index may be matched by system 100 to the second index to form a binary option. The binary option may be made available for trading on the system 100.

In some embodiments, the first index may be selected by a user by selecting one or more trading products. In some embodiments, each trading product may have the same weighting in the index (e.g., the index effectively starts with $10 of each selected trading product at a start time). For example, the relative weightings may be equal by default. In some embodiments, different weightings of the component trading products in an index may be selected by the user, e.g., via selecting a quantity of shares, a dollar value, a percentage of the total index (or portfolio), etc.

In some embodiments, an index may change its composition or relative weightings over time. For example, the S&P 500 index changes its weighting and composition over time in order to re-balance itself. In some embodiments, a user-configured index may be modified by the user, e.g., during the relevant performance time period. For example, a user may exchange one quantity of stock in the first index's portfolio for an equivalent value (at then-current market values) of another stock.

The second index may be a well-known financial index. For example, the second index may be the NASDAQ, the S&P 500, or another similar well-known index. The second index may alternatively be a third party index that is not well-known. The second index may include a predetermined number of financial instruments. The second index may include the same number of financial instruments as the first index. The second index may alternatively include fewer financial instruments or more financial instruments than the first index. The second index may include any of the types of financial instruments mentioned above for the first index. The second index may include any other financial instruments. The financial instruments to be included in the second index may be predetermined by system 100. A trader (or other user of system 100) may alternatively select the financial instruments to be included in the second index. For example, a trader may select ten financial instruments for inclusion in the second index, and may submit the second index to system 100. A trader may select the financial instruments and submit the index using a graphic user interface of system 100. The second index may be matched by system 100 to the first index or to another index to form a binary option.

The period of time may be predetermined by system 100, may be selected by a trader buying or selling the binary option, may be selected by a trader or by system 100 when the financial instruments are selected for inclusion into one or both of the first and second indices, or may be selected by a trader or system 100 at the time that the first and second indices are matched to form the binary option. The period of time may be, for example, 5 minutes, an hour, a week, a trading day, a trading week, or any other period of time. The period of time may specify a start time, an end time, or both a start time and an end time. For example, the period of time may start when the binary option has been created and first offered on system 100 for trading. The start time may be a specified time in the future, e.g., in 5 minutes, in an hour, at the close of trading, at the opening of trading tomorrow, a specified time tomorrow, a specified time next week, etc., or any other time. The end time may be any time after the start time. The end time may be determined or calculated based on the start time and the period of time. Alternatively, the start and end times may be set or selected and the period of time may be determined or calculated from the start and end times.

In an embodiment, the binary option may be generated by the system and placed on the system for traders to buy and sell. The binary option may include two sides, a first side including an option that the first index will have a greater return than the second index for the period of time, and a second side including an option that the second index will have a greater return than the first index for the period of time. Traders may buy or sell the first and second sides on system 100.

For example, a trader (or other user of system 100) may enter an order with system 100 to buy or sell a side of the binary option prior to the expiration of the period of time. The trader may specify a purchase price for a side of the binary option. For example, the trader may place an order to buy a side of the binary option for $0.69 a unit, e.g., $0.69 per $1.00 of the binary option. If the rate of return for the selected index is greater than the rate of return for the non-selected index, the trader receives $1.00 per unit of the binary option in compensation. If the rate of return of the non-selected index is greater than the rate of return of the selected index, the trader compensates the system 100 with an additional $0.31 per unit, e.g., $0.31 per unit of the binary option. In an example, the trader buys a side of the binary option corresponding to the first index having a greater rate of return than the second index for the period of time. If the first index has a rate of return for the period of time of 5% and the second index has a rate of return for the period of time of 3%, meeting the traders side, the trader is compensated $1.00 per unit of the binary option. The order may be placed for other values without departing from the scope of the present disclosure. The system may alternatively set the price to buy or sell a side of the binary option. Another trader may buy or sell the opposing side of the binary option for $0.31 per unit, e.g., $0.31 per $1.00 of the binary option. The buying or selling of the opposing side may offset the first trader's side in the system. The trader may alternatively pay set fee to participate in a side of the binary option. For example, the trader may pay a fee of $55.00 or any other value to participate in a side of the binary option. If the trader's side is met, e.g., has a greater rate of return than the opposing side, the trader may receive a predetermined compensation. The compensation may be based on the fee. For example, the compensation may be $110.00, e.g., twice the fee. In another example, the compensation may be $100.00 with system 100 taking a commission of $5.00.

Any number of additional indices may also be generated in any of the manners described above for the first and second indices. The additional indices may be matched together to form binary options. The first index and the second index may also or alternatively be matched with additional indices to form a binary option. For example, the binary option may include two indices, three indices, four indices, five indices, or any number of indices. In the case where there are more than two indices matched together, the binary option may include one or more sides for each index where, for example, traders may buy or sell options for each potential outcome. For example, if the binary option includes a first index, a second index, and a third index, a trader may buy or sell an option for a side that the first index will have a greater rate of return than each of the second and third indices for the period of time, for a side that the second index will have a greater rate of return than each of the first and third indices for the period of time, for a side that the third index will have a greater rate of return than each of the first and second indices for the period of time, for a side that the first index will not have a greater rate of return than one or both of the second and third indices for the period of time, for a side that the second index will not have a greater rate of return one or both of the first and third indices for the period of time, for a side that the third index will not have a greater rate of return than one or both of the first and second indices for the period of time, or for a side including any other combination. For example, a trader may buy or sell an option that one of the indices will have a rate of return that is between the other two indices in the binary option for the period of time. The compensation for buying a successful binary option may be greater for binary options having more than two indices than for those having only two indices.

Fantasy Contests

In some embodiments, system 100 may provide users with one or more fantasy contests. The fantasy contests may be implemented on system 100 and may be provided to users via computing devices 200. The fantasy contest may be presented to the users on a display 230 of a computing device 200 as a graphic user interface. Examples of fantasy contests are provided below.

User Index Vs. Well-Known Index

In an embodiment, a fantasy contest may include comparing a rate of return of a user's index over a period of time to the rate of return of a well-known index over the first period of time.

In the contest, the user may be provided with a number of different premade indices of financial instruments by the system. The premade indices may be similar to the first and second indices described above. For example, the premade indices may be formed by traders or other users, or by system 100. The user may choose one of the premade indices as the user's index. Alternatively, the system may allow the user to select financial instruments for inclusion in the user's index in the manner described above for the first and second indices.

Once the user has selected the first index, the system may automatically select the well-known index, may provide the user with the option to select the well-known index, or the well-known index may be predetermined at the start of the contest. The predetermined well-known index may be provided to the user prior to or at the start of the contest. For example, the user or system 100 may select NASDAQ as the well-known index.

The period of time may be selected in the manner described above.

Once the first index and the well-known index have been selected, a binary option may be created and sold. The binary option may pay out if the first index beats the well-known index over the relevant time period in some performance metric, such as rate of return.

A user may create an index, e.g., by selecting financial one or more instruments in the manner described above for the first and second indices. The user may also or alternatively select a well-known index, e.g., DJIA, S&P 500, or other similar well-known indices. The user's index and the well-known index may be matched by system 100 for a contest. The user may also select a period of time for the contest, similar to the period of time described above. The winner of the contest may be determined in a similar manner to that described above for the binary options where the index with the greater rate of return for the period of time is the winner.

In some embodiments, a portfolio may be modified during the relevant period of time. For example, a user may "sell" all or a portion of the portfolio (e.g., using current market prices) and use the "proceeds" to buy different trading products for the portfolio.

It should be appreciated that rate of return over a specified period of time is one performance metric. Other metrics may include beta, most dividends, worst rate of return (or other performance metric), highest average (or weighted) price to earnings of underlying stocks, and other metrics.

In some embodiments, users of the system may be allowed to participate in a fantasy contest. System 100 may prompt a user to select an index for the contest. For example, the user may select the first index mentioned above. Alternatively, the user may generate an index as described above by selecting financial instruments for inclusion in the index.

In some embodiments, users may participate in a fantasy contest on system 100. Each user may select one or more financial instruments for inclusion in a user-defined index, e.g., in the manner described above for the first and second indices. Each user may enter the index into system 100 with an indication that the user desires to participate in a fantasy contest. The user may compete in the contest against system 100 (e.g., a system-defined index) and/or against one or more other users of system 100. For example, system 100 may include a pre-generated index or may select financial instruments for inclusion in its reference index.

In the fantasy contest, the user may select financial instruments for inclusion in a first index and the system 100 or another user selects financial instruments for inclusion in a second index. The financial instruments for the first and second indices may be selected or determined in the manner set forth, e.g., in the previous embodiment. The first index is then matched against another index (e.g., system index or other user's index). A performance metric such as rate of return for the index may then be compared to the rate of return for an index selected by system 100 or by the other user to determine an outcome. The user may be paid (e.g., via a payout on a user's binary option), e.g., if the user's index wins the contest.

The fantasy contest may determine an outcome to the contest by comparing the rate of return for the index selected by the user to the rate of return of a second index for a period of time. If the user's index has a greater rate of return, the user wins the contest and receives a payout.

The user may select the financial instruments to be included in the user index in the manner described above for the first index. For example, the user may select 10 financial instruments for inclusion in the user's index.

The user, a second user, or the system may select the financial instruments to be included in the second index in a similar manner as described above.

In some embodiments, users may challenge other users to a head-to-head contest, e.g., one user's index against another user's contest. One or more binary options may be used to accomplish the necessary payouts (e.g., first user is paid if first user's index wins, and second user is paid if second user's index wins—for example, using a first binary option that pays out if the first index beats the second and a second binary option that pays out if the second index beats the first). Users may view a list of indices of other users and select one (or more) to challenge. If the other user accepts the challenge, then the necessary binary options may be created and the contest may be run (between the two indices).

It should be appreciated that the host system may receive revenue in a variety of ways. For example, a fee may be paid to the system per transaction, or a percentage of each payout may be paid as a fee. Other revenue models may be considered.

In the contest, the user may pay an entry fee, e.g., $55.00 or any other amount. In the contest, the user selects financial instruments to form a user's index in the manner described above for the first and second indices. The user's index is then compared to a second index, for example, an index predetermined by system 100, selected by system 100, selected by the user, or selected by another user. The user may then use the user's index to compete against one or more other user's indices. The user or system 100 may then may submit the index to the system 100 for matching to a second index as part of the game. The user may pay an entry fee.

Group Bet Binary Options

In some embodiments, different users may select from a plurality of different indices and/or configure one or more of their own indices. A user may select a specific index, and a binary option may be sold to the user corresponding to the specific index having the highest rate of return over a specified period of time. Different users may select an index from among a plurality of indices. A binary option may be created for each index, and such binary option may have value (or "pay out") if the associated index has the highest rate of return over a specified time period.

In some embodiments, one or more binary options may be used to model a "Group Bet" wager as described in U.S. Ser. No. 11/076,561 filed Mar. 9, 2005, the disclosure of which is incorporated herein by reference. As disclosed in the '561 patent application, a user may bet on a group of horses in a horse race instead of a single horse. By analogy, betting on a single horse in a horse race is analogous to a single binary option that pays out if a single index beats one or more other indices (like a single horse winning a race against a number of other horses). Using the systems and methods disclosed in the '561 application, binary options can be created and traded to model a selection of multiple indices from the total plurality of indices. In other words, one or more binary options can be created and traded to model a "bet" that at least one of a group of indices will have the highest performance metric (e.g., highest rate of return over a designated period) from among the total plurality of indices. In this way, a user may "bet" on a group of indices instead of a single index.

As described in the '561 application, the "group bet" can be in a pari-mutuel pool with the other "bets" on a single index. In this way, the "house"/"casino"/central system can offset risk in a pari-mutuel style "betting system" using binary options. For example, the central system may sell binary options to a plurality of users who select one or more indices from among a plurality of possible indices for selection. (Again, this is analogous to users each betting on a horse or group of horses from among a plurality of horses in a race.) The proceeds of the binary option sales may be pooled together to pay out the "winner(s)". In some embodiments, users may customize their own indices, or select from one or more default options (like the S&P 500). A binary option on a single index may be analogous to a "bet" that the single index will have a better performance metric than all the others in the "race" (e.g., will have the best rate of return over a specified period of time). The central system/house will end up with a "rake" or cut of the binary option sale proceeds, and the "winner(s)" will be paid from that pool.

In some embodiments, the users may make their selections of each index (or group of indexes) before any binary options are sold. Once all selections are in, the binary options may be sold in amounts that effectively mimic the analogous situation of horse race betting on single horses and "group bets" (as described in the '561 application).

In some embodiments, binary options can be created and combined so that payouts are not "all or none," but rather graded such that, for example, different "places" earn different amounts. For example, a winner is paid out the highest amount, second place pays out a next highest amount, third place pays out the next highest, etc. The last place (or last several places) may pay out zero. For example, a binary option that pays if a user's selected index (index A) "wins" against a plurality of other indices (e.g., indices B-E) may be comprised of a plurality of constituent binary options. For example, the constituent binary options in this scenario may comprise one binary option that Index A will outperform Index B, one binary option that A will outperform C, one binary option that A will outperform D, and one binary option that A will outperform E. The user's "bet" on A may actually comprise these constituent binary options. Then, if A comes in third place (behind B and C), then the user's "bet" will still have a third place payout based on the two binary option payouts for A beating D and A beating E. In this way, a contest among a plurality of users/indices may employ binary options to yield different prize amounts.

It should be appreciated that any portfolio (e.g., of financial instruments) can be considered an index. It should also be appreciated that while dollar values can be used to represent different amounts of a various securities, none of these dollar amounts need actually be purchased. For purposes of an index, the index/portfolio need only be defined. Dollar values can be used to specify different relative amounts of different securities. It does not matter if one portfolio has a larger total dollar value than another if the performance metric is, e.g., rate of return. It should also be appreciated that performance metrics can be normalized. For example, if the performance metric is "most dividends during the relevant time period," the calculation of dividends can divide by the value of the portfolio. (Or equivalently, each portfolio can be recalibrated or normalized to a starting value of 1 or 100.)

It should be appreciated that various systems and methods described herein may have or implement one or more of the Binary Options exchange features described in U.S. Ser. No. 61/768,117 filed Feb. 22, 2013, U.S. Ser. No. 13/832,955 filed Mar. 15, 2013, U.S. Ser. No. 13/832,916 filed Mar. 15, 2013, and U.S. Ser. No. 13/832,997 filed Mar. 15, 2013, the disclosures of which are incorporated by reference herein in their entireties. For example, the interfaces shown in the Figures of those applications may be used as interfaces as described herein. Similarly, methods of computing indices, determining prices and values, receiving and matching bids and offers, and other features may be implemented.

Figure 2:
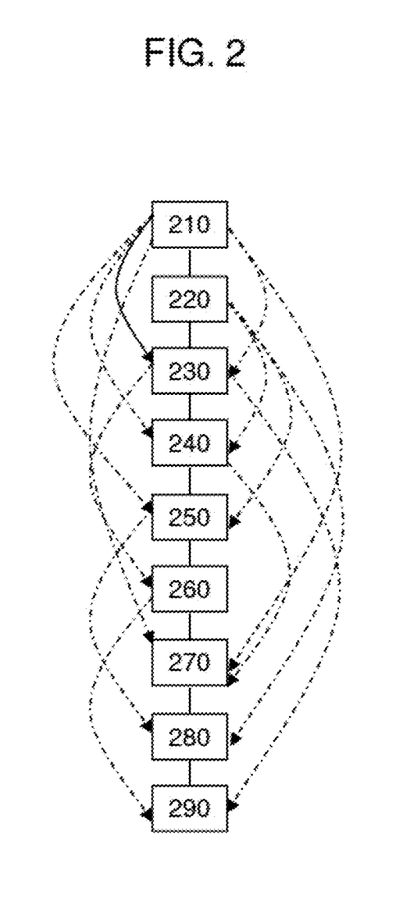
FIG. 2 depicts an exemplary flow chart according to at least one embodiment of the systems disclosed herein.

FIG. 2 depicts an exemplary flow chart according to at least one embodiment of the systems disclosed herein.

In block 200, a user may be presented with an opportunity to create an index.

In block 210, a user may configure an index by selecting one or more trading products for inclusion in the user's index.

In block 220, a user may select relative amounts of the trading products. For example, a user may select $20 of Google stock and $200 of Exxon bonds.

In block 230, a user may view other indices, e.g., of the system or other users. The user may also view historical information, e.g., how one or more indices would have performed during another (e.g., user-selectable) time period, such as the past 30 days, past year, past 5 years, or between 1999 and 2009.

In block 240, a user may challenge one or more other users to a contest, e.g., one user's index vs. another user's index over a specified time period.

In block 250, the second user (e.g., and one or more other users) may accept the challenge. Alternately, the user may enter into a contest with a default index such as the S&P 500 (e.g., a system index).

In block 260, one or more binary options may be created and/or purchased to configure the correct payout scheme for the contest. For example, one user may sell a competing user a binary option. The first user keeps the proceeds if his index beats the second user's index, and the second user is paid a payout (e.g., twice the purchase price) if the second user's index beats the first user's index. Once the binary options have been issued, the context may commence, e.g., according to a configured time period.

In block 270, the performance of the various indices may be determined, e.g., at the end of the relevant time period. For example, the rates of return for each index may be calculated for the relevant time period.

In block 280, a final value of the one or more binary options may be calculated based on the outcome at the end of the time period.

In block 290, the "winner(s)" may be paid out based on the calculated value of the one or more binary options.

It should be appreciated that the central system may act as a bank, escrow agent, or other broker or intermediary function to facilitate the systems and methods described herein.

It should be appreciated that the actions described in the blocks for the methods described herein are exemplary only, and need not be performed in the order presented here. Further, it is not necessary to accomplish all of the actions described in the blocks. Rather, any number of the blocks (e.g., four of the blocks or six of the blocks) may be accomplished, and in any order. Further, the actions described herein may be combined with any other actions described herein, in any order.

Figure 3:
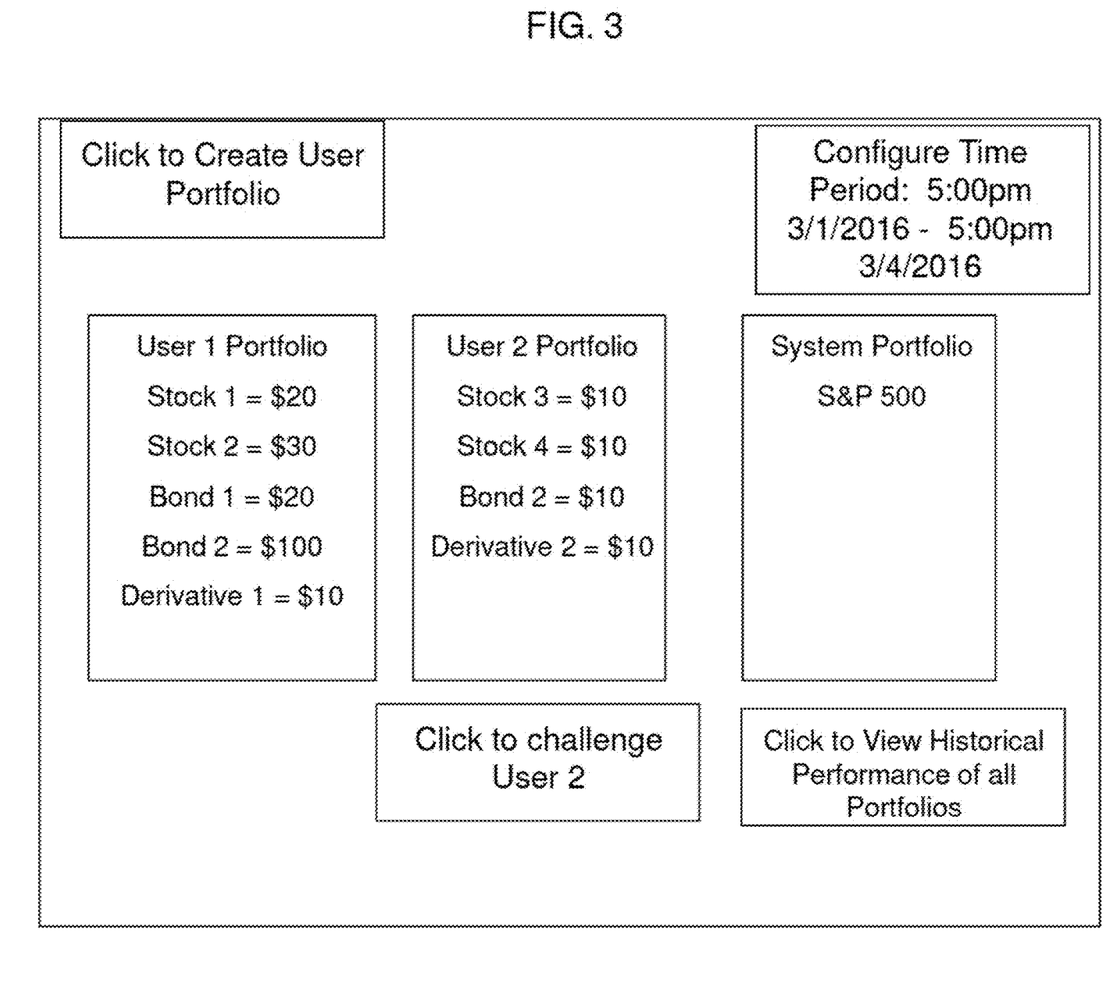
FIG. 3 depicts an exemplary user interface according to various embodiments of the systems disclosed herein.

FIG. 3 depicts an exemplary user interface according to various embodiments of the systems disclosed herein. As shown in FIG. 3, the interface enables a user to create a user portfolio, select financial instruments and relative amounts, configure a relevant time period (e.g., for a contest), challenge one or more other users, and view historical information. Other binary options interfaces may be used, e.g., as incorporated from other patent applications mentioned herein.

The disclosures of the above-identified applications, and all other patent applications and other documents referenced in this patent application, are incorporated by reference herein in their entireties. It should also be appreciated that various features of the computer systems, processors, software, and methods described in the incorporated applications may be used to accomplish the systems and methods described herein.

The following embodiments A1 through A20 are exemplary embodiments:

A1. A method comprising:
receiving, by at least one processor of at least one computer, from a first user a specification of a first index comprising a first portfolio, the specification defining one or more trading products in the first portfolio;
determining, by the at least one processor, at least one second index each comprising a respective at least one second portfolio, each at least one second portfolio comprising at least one trading product;
determining, by the at least one processor, a period of time defining a start time and an end time;
causing, by the at least one processor, to be output to the first user, at a first electronic display device associated with the first user, indicia of a first binary option associated with the first index, the at least one second index, and the period of time, the indicia comprising information about the first index, information about the at least one second index, and the end time;
before the end time, receiving, by the at least one processor, a request to purchase a quantity of the first binary option,
wherein at a time before the end time, the first binary option is defined to settle at a future time to one of two possible values comprising a first final value and a second final value;
before the end time, transacting a first trade comprising a purchase and sale of the quantity of the first binary option;
determining, by the at least one processor, a first rate of return for the first index by comparing a value of the first index at the end time to a value of the first index at the start time;
determining, by the at least one processor, at least one second rate of return for the at least one second index by comparing, for each of the at least one second index, a value of the respective second index at the end time to a value of the respective second index at the start time;
determining, by the at least one processor, a final value of the first binary option, in which determining the final value of the first binary option comprises one of:
determining that the first binary option has a value equal to the first final value responsive to determining that the first rate of return for the first index is one of (a) higher than and (b) higher than or equal to each of the at least one second rate of return for the at least one second index; and
determining that the first binary option has a value equal to the second final value responsive to determining that the first rate of return for the first index is one of (a) less than and (b) less than or equal to each of the at least one second rate of return for the at least one second index.

A2. The method of embodiment A1, in which the act of receiving a specification comprises:
receiving a selection of a plurality of financial instruments for inclusion in the first portfolio; and
receiving a selection of a quantity of each of the plurality of financial instruments for inclusion in the first portfolio.

A3. The method of embodiment A2, in which the act of receiving a selection of a quantity of the financial instruments comprises:
receiving a value associated with a first of the financial instruments in the first portfolio, representing an amount of cash invested in the first financial instruments according to the first financial instrument's market value effective at the start time.

A4. The method of embodiment A1,
in which the at least one second index consists of a single second index,
in which the act of determining at least one second rate of return comprises:
determining a single second rate of return by dividing a value of the single second index at the end time by a value of the single second index at the start time; and
in which the act of determining the final value of the first binary option comprises one of:
determining that the first binary option has a value equal to the first final value responsive to determining that the first rate of return for the first index is higher than the single second rate of return for the single second index; and
determining that the first binary option has a value equal to the second final value responsive to determining that the first rate of return for the first index is less than the single second rate of return for the single second index.

A5. The method of embodiment A1,
in which the at least one second index comprises a plurality of second indices, each second index comprising a different portfolio comprising a different combination of financial instruments,
in which the act of determining at least one second rate of return comprises determining a rate of return for each of the plurality of second indices by:
for each of the plurality of second indices, determining a rate of return for the respective second index by dividing a value of the respective second index at the end time by a value of the respective second index at the start time; and
in which the act of determining the final value of the first binary option comprises one of:
determining that the first binary option has a value equal to the first final value responsive to determining that the first rate of return for the first index is higher than the rate of return for each of the plurality of second indices; and
determining that the first binary option has a value equal to the second final value responsive to determining that the first rate of return for the first index is less than the rate of return for each of the plurality of second indices.

A6. The method of embodiment A5, in which the plurality of second indices comprises at least a third index and a fourth index, further comprising:

receiving, by at least one processor, from a second user a specification of the third index comprising a third portfolio, the specification defining one or more trading products in the third portfolio;

receiving, by at least one processor, from a third user a specification of the fourth index comprising a fourth portfolio, the specification defining one or more trading products in the fourth portfolio;

causing, by the at least one processor, to be output to the second user, at a second electronic display device associated with the second user, indicia of a second binary option associated with the first index, the third index, the fourth index, and the period of time, the indicia comprising information about the first index, information about the third index, information about the fourth index, and the end time;

causing, by the at least one processor, to be output to the third user, at a third electronic display device associated with the third user, indicia of a second binary option associated with the first index, the third index, the fourth index, and the period of time, the indicia comprising information about the first index, information about the third index, information about the fourth index, and the end time;

before the end time, receiving, by the at least one processor, a request to purchase a quantity of the second binary option, wherein at a time before the end time, the second binary option is defined to settle at a future time to one of two possible values comprising a third final value and a second final value;

before the end time, receiving, by the at least one processor, a request to purchase a quantity of the third binary option, wherein at a time before the end time, the third binary option is defined to settle at a future time to one of two possible values comprising a fourth final value and a second final value;

before the end time, transacting a second trade comprising a purchase and sale of the quantity of the second binary option;

before the end time, transacting a third trade comprising a purchase and sale of the quantity of the third binary option;

determining, by the at least one processor, a first rate of return for the first index by comparing a value of the first index at the end time to a value of the first index at the start time;

in which the act of determining the at least one second rate of return comprises:

determining a third rate of return for the third index by comparing a value of the third index at the end time to a value of the third index at the start time; and determining a fourth rate of return for the fourth index by comparing a value of the fourth index at the end time to a value of the fourth index at the start time;

determining, by the at least one processor, a final value of the second binary option, in which determining the final value of the second binary option comprises one of:

determining that the second binary option has a value equal to the third final value responsive to determining that the third rate of return for the third index is higher than the first rate of return of the first index and the fourth rate of return of the fourth index; and determining that the second binary option has a value equal to the second final value responsive to determining that the third rate of return for the third index is less than the first rate of return of the first index and the fourth rate of return of the fourth index; and determining, by the at least one processor, a final value of the third binary option, in which determining the final value of the third binary option comprises one of:

determining that the third binary option has a value equal to the fourth final value responsive to determining that the fourth rate of return for the fourth index is higher than the first rate of return of the first index and the third rate of return of the third index; and determining that the third binary option has a value equal to the second final value responsive to determining that the fourth rate of return for the fourth index is less than the first rate of return of the first index and the third rate of return of the third index.

A7. The method of embodiment A6, in which one of the first binary option, the second binary option, and the third binary option is determined to have a positive non-zero value, and in which two of the first binary option, the second binary option, and the third binary option are determined to have a value of zero.

A8. The method of embodiment A6, in which the first portfolio comprises a plurality of financial instruments selected by the first user in relative quantities selected by the first user;

in which the third portfolio comprises a plurality of financial instruments selected by the second user in relative quantities selected by the second user;

in which the fourth portfolio comprises a plurality of financial instruments selected by the third user in relative quantities selected by the third user; and in which the first rate of return, the third rate of return, and the fourth rate of return are each different from one another.

A9. The method of embodiment A1, further comprising:

at a time between the start time and the end time, causing to be displayed to the first user, at the first electronic display device, information indicating a current value of the first index and information indicating at least one current value of each respective at least one second index.

A10. The method of embodiment A1, in which the act of transacting a first trade comprises:

before the end time:

receiving one or more bids to purchase the first binary option, each bid comprising a bid price;

receiving one or more offers to sell the first binary option, each offer comprising an offer price;

matching a bid with an offer; and transacting a trade by executing the bid against the offer.

A11. The method of embodiment A1, in which the act of transacting a first trade comprises, before the start time:

receiving one or more bids to purchase the first binary option, each bid comprising a bid price;

receiving one or more offers to sell the first binary option, each offer comprising an offer price;

matching a bid with an offer; and transacting a trade by executing the bid against the offer;

in which the act of transacting the first trade comprises the first user purchasing the quantity of the first binary option, further comprising:

after transacting the first trade and before the end time, transacting a second trade comprising a sale of at least a portion of the quantity of the first binary option from the first user to another user.

A12. The method of embodiment A11, further comprising:

before the first user purchases the quantity of the first binary option, causing to be output to the first user, at the first electronic display device, first historical performance information indicating information about a value of the first index over a prior period of time and second historical information indicating information about a value of each of the at least one second index over the same prior period of time.

A13. The method of embodiment A12, in which the at least one second index consists of a single second index comprising a portfolio comprising specified quantities of a plurality of financial instruments, and in which information about the specified quantities of the plurality of financial instruments of the single second index is provided to the first user at the first electronic display device before the act of receiving from the first user the specification defining one or more trading products in the first portfolio.

A14. The method of embodiment A1, in which the first final value is a non-zero positive value and the second final value is zero.

A15. The method of embodiment A1, in which the second index comprises one of (a) Dow Jones Industrial Average, (b) S&P 500 Index, (c) NASDAQ Composite, and (d) FTSE index.

A16. The method of embodiment A1, in which at least one of the first portfolio and the at least one second portfolio comprises a quantity of cash.

A17. The method of embodiment A1, in which the first portfolio comprises one or more derivative financial instruments, and in which the first portfolio changes in composition during the period of time such that the trading products in the first portfolio at the start time are different from the trading products in the first portfolio at the end time.

A18. The method of embodiment A1, in which the first portfolio consists of a predetermined number of different financial products selected from a predetermined list of securities traded on at least one of the New York Stock Exchange, NASDAQ, and the Chicago Mercantile Exchange.

A19. An apparatus comprising:
at least one processor; and
at least one memory having instructions stored thereon which, when executed by the at least one processor, direct the at least one processor to perform the method of any of embodiments A1-A18.

A20. A computer-readable medium having instructions stored thereon which, when executed by the at least one processor, direct the at least one processor to perform the method of any of embodiments A1-A18.

The above description is included to illustrate the operation of the preferred embodiments and is not meant to limit the scope of the invention. The scope of the invention is to be limited only by the following claims. From the above discussion, many variations will be apparent to one skilled in the relevant art that would yet be encompassed by the spirit and scope of the invention.

What is claimed is:

1. A method comprising:
controlling, by at least one processor:
receiving, over a communication network, from a first computing device of a first user, a first specification of a first index comprising a first portfolio, the first specification defining one or more first trading products in the first portfolio;
receiving, over the communication network, from another computing device of another user different from the first user, another specification of another index comprising another portfolio, the another specification defining one or more another trading products in the another portfolio;
determining at least one second index comprising a respective at least one second portfolio, each of the at least one second portfolio comprising at least one second trading product;
monitoring progression of a period of time from a start time of the period of time to an end time of the period of time;
displaying, over the communication network, at a first electronic display device and another electronic display device associated with the first computing device and the another computing device, respectively, first indicia of a first binary option associated with the first index, another binary option associated with the another index, the at least one second index, and a current time of the progression of the period of time, the first indicia comprising information about the first index, information about the another index, information about the at least one second index, and the end time;
before the end time,
receiving over the communication network, from the first computing device a challenge of a head-to-head contest of the first index against the another index, in which the challenge is by a selection to a graphical user interface at the first electronic display device,
receiving, over the communication network, from the another computing device acceptance of the challenge, in which the acceptance is by a selection to a graphical user interface at the another electronic display device, and
displaying, over the communication network, at the first electronic display device and the another electronic display device respectively of the first computing device and the another computing device, indicia of a challenge binary option associated with a contest between the first index and the another index;
before the end time, receiving, over the communication network, from a plurality of computing devices including the first computing device and the another computing device, a request to purchase a quantity of the first binary option and a quantity of the challenge binary option,
wherein at a time before the end time, each of the first binary option and the challenge binary option is defined to settle at a future time to one of two possible values comprising a respective first final value and a second final value;
before the end time, facilitating transacting a first trade and another trade comprising a purchase and sale respectively of the quantity of the first binary option and the quantity of the challenge binary option;

determining a first rate of return for the first index by comparing a value of the first index at the end time to a value of the first index at the start time, and another rate of return for the another index by comparing a value of the another index at the end time to a value of the another index at the start time;

determining at least one second rate of return for the at least one second index by comparing, for each of the at least one second index, a value of the respective second index at the end time to a value of the respective second index at the start time; and determining (i) a final value of the first binary option, in which determining the final value of the first binary option comprises one of:

determining that the first binary option has a value equal to the first final value of the first binary option responsive to determining that the first rate of return for the first index is one of (a) higher than and (b) higher than or equal to each of the at least one second rate of return for the at least one second index; and determining that the first binary option has a value equal to the second final value of the first binary option responsive to determining that the first rate of return for the first index is one of (a) less than and (b) less than or equal to each of the at least one second rate of return for the at least one second index; and (ii) a final value of the challenge binary option, in which determining the final value of the challenge binary option comprises one of:

determining that the challenge binary option has a value equal to the first final value of the challenge binary option responsive to determining that the first rate of return for the another index is one of (a) higher than and (b) higher than or equal to the first rate of return for the first index; and determining that the challenge binary option has a value equal to the second final value of the challenge binary option responsive to determining that the first rate of return for the another index is one of (a) less than and (b) less than or equal to the first rate of return for the first index.

2. The method of claim 1, in which receiving the first specification comprises:

receiving a selection of a plurality of financial instruments for inclusion in the first portfolio; and receiving a selection of a quantity of each of the plurality of financial instruments for inclusion in the first portfolio.

3. The method of claim 2, in which receiving a selection of a quantity of the financial instruments comprises:

receiving a value associated with a first of the financial instruments in the first portfolio, representing an amount of cash invested in the first financial instruments according to the first financial instrument's market value effective at the start time.

4. The method of claim 1, in which the at least one second index consists of a single second index, in which determining at least one second rate of return comprises:

determining a single second rate of return by dividing a value of the single second index at the end time by a value of the single second index at the start time; and in which determining the final value of the first binary option comprises one of:

determining that the first binary option has a value equal to the first final value of the first binary option responsive to determining that the first rate of return for the first index is higher than the single second rate of return for the single second index; and determining that the first binary option has a value equal to the second final value of the first binary option responsive to determining that the first rate of return for the first index is less than the single second rate of return for the single second index.

5. The method of claim 1, in which the at least one second index comprises a plurality of second indices, each of the second indices comprising a different portfolio comprising a different combination of financial instruments, in which determining at least one second rate of return comprises determining a rate of return for each of the plurality of second indices by:

for each of the plurality of second indices, determining a rate of return for the respective second index by dividing a value of the respective second index at the end time by a value of the respective second index at the start time; and in which determining the final value of the first binary option comprises one of:

determining that the first binary option has a value equal to the first final value of the first binary option responsive to determining that the first rate of return for the first index is higher than the rate of return for each of the plurality of second indices; and determining that the first binary option has a value equal to the second final value of the first binary option responsive to determining that the first rate of return for the first index is less than the rate of return for each of the plurality of second indices.

6. The method of claim 5, in which the plurality of second indices comprises at least a third index and a fourth index, and further comprising controlling, by the at least one processor:

receiving, over the communication network, from a second computing device of a second user a second specification of the third index comprising a third portfolio, the second specification defining one or more trading products in the third portfolio;

receiving from a third user a third specification of the fourth index comprising a fourth portfolio, the third specification defining one or more trading products in the fourth portfolio;

displaying, over the communication network, at a second electronic display device associated with the second computing device, second indicia of a second binary option associated with the first index, the third index, the fourth index, and the period of time, the second indicia comprising information about the first index, information about the third index, information about the fourth index, and the end time;

displaying, over the communication network, at a third electronic display device associated with the third user, third indicia of a third binary option associated with the first index, the third index, the fourth index, and the period of time, the indicia comprising information about the first index, information about the third index, information about the fourth index, and the end time;

before the end time, receiving a request to purchase a quantity of the second binary option, wherein at a time before the end time, the second binary option is defined to settle at a future time to one of two possible values comprising a third final value and a second final value;

before the end time, receiving a request to purchase a quantity of the third binary option, wherein at a time before the end time, the third binary option is defined to settle at a future time to one of two possible values comprising a fourth final value and a second final value;

before the end time, transacting a second trade comprising a purchase and sale of the quantity of the second binary option;

before the end time, transacting a third trade comprising a purchase and sale of the quantity of the third binary option;

determining a first rate of return for the first index by comparing a value of the first index at the end time to a value of the first index at the start time;

in which determining the at least one second rate of return comprises:

determining a third rate of return for the third index by comparing a value of the third index at the end time to a value of the third index at the start time; and determining a fourth rate of return for the fourth index by comparing a value of the fourth index at the end time to a value of the fourth index at the start time;

determining a final value of the second binary option, in which determining the final value of the second binary option comprises one of:

determining that the second binary option has a value equal to the third final value responsive to determining that the third rate of return for the third index is higher than the first rate of return of the first index and the fourth rate of return of the fourth index; and determining that the second binary option has a value equal to the second final value responsive to determining that the third rate of return for the third index is less than the first rate of return of the first index and the fourth rate of return of the fourth index; and determining a final value of the third binary option, in which determining the final value of the third binary option comprises one of:

determining that the third binary option has a value equal to the fourth final value responsive to determining that the fourth rate of return for the fourth index is higher than the first rate of return of the first index and the third rate of return of the third index; and determining that the third binary option has a value equal to the second final value responsive to determining that the fourth rate of return for the fourth index is less than the first rate of return of the first index and the third rate of return of the third index.

7. The method of claim 6,
in which one of the first binary option, the second binary option, and the third binary option is determined to have a positive non-zero value, and
in which two of the first binary option, the second binary option, and the third binary option are determined to have a value of zero.

8. The method of claim 6,
in which the first portfolio comprises a plurality of financial instruments selected by the first user in relative quantities selected by the first user;
in which the third portfolio comprises a plurality of financial instruments selected by the second user in relative quantities selected by the second user;
in which the fourth portfolio comprises a plurality of financial instruments selected by the third user in relative quantities selected by the third user; and
in which the first rate of return, the third rate of return, and the fourth rate of return are each different from one another.

9. The method of claim 1, further comprising controlling, by the at least one processor:
at a time between the start time and the end time, displaying, over the communication network, at the first electronic display device, information indicating a current value of the first index and information indicating at least one current value of each respective at least one second index.

10. The method of claim 1, in which facilitating transacting the first trade comprises:
before the end time:
receiving one or more bids to purchase the first binary option, each bid comprising a bid price;
receiving one or more offers to sell the first binary option, each offer comprising an offer price;
matching a bid with an offer; and
transacting a trade by executing the bid against the offer.

11. The method of claim 1,
in which transacting the first trade comprises, before the start time:
receiving one or more bids to purchase the first binary option, each bid comprising a bid price;
receiving one or more offers to sell the first binary option, each of the offers comprising an offer price;
matching a bid with a given offer; and
transacting the first trade by executing the bid against the given offer;
in which transacting the first trade comprises the first user purchasing the quantity of the first binary option, and
further comprising controlling, by the at least one processor:
after transacting the first trade and before the end time, facilitating transacting a second trade comprising a sale of at least a portion of the quantity of the first binary option from the first user to another user.

12. The method of claim 11, further comprising controlling, by the at least one processor:
before the first user purchases the quantity of the first binary option, displaying, over the communication network, at the first electronic display device, first historical performance information indicating information about a value of the first index over a prior period of time and second historical information indicating information about a value of each of the at least one second index over the same prior period of time.

13. The method of claim 12,
in which the at least one second index consists of a single second index comprising a portfolio comprising specified quantities of a plurality of financial instruments, and
in which information about the specified quantities of the plurality of financial instruments of the single second index is provided to the first user at the first electronic display device before the first specification defining one or more trading products in the first portfolio is received from the first user.

14. The method of claim 1, in which the first final value is a non-zero positive value and the second final value is zero.

15. The method of claim 1, in which the second index comprises at least one of (a) Dow Jones Industrial Average, (b) S&P 500 Index, (c) NASDAQ Composite or (d) FTSE index.

16. The method of claim 1, in which at least one of the first portfolio or the at least one second portfolio comprises a quantity of cash.

17. The method of claim 1, in which the first portfolio comprises one or more derivative financial instruments, and
   in which the first portfolio changes in composition during the period of time such that the first trading products in the first portfolio at the start time are different from the first trading products in the first portfolio at the end time.

18. The method of claim 1, in which the first portfolio includes a predetermined number of different financial products selected from a predetermined list of securities traded on at least one of the New York Stock Exchange, NASDAQ, or the Chicago Mercantile Exchange.

19. An apparatus comprising:
   at least one processor configured to control:
   receiving, over a communication network, from a first computing device of a first user, a first specification of a first index comprising a first portfolio, the first specification defining one or more first trading products in the first portfolio;
   receiving, over the communication network, from another computing device of another user different from the first user, another specification of another index comprising another portfolio, the another specification defining one or more another trading products in the another portfolio;
   determining at least one second index comprising a respective at least one second portfolio, each of the at least one second portfolio comprising at least one second trading product;
   monitoring progression of a period of time from a start time of the period of time to an end time of the period of time;
   displaying, over the communication network, at a first electronic display device and another electronic display device associated with the first computing device and the another computing device, respectively, first indicia of a first binary option associated with the first index, another binary option associated with the another index, the at least one second index, and a current time of the progression of the period of time, the first indicia comprising information about the first index, information about the another index, information about the at least one second index, and the end time;
   before the end time,
      receiving over the communication network, from the first computing device a challenge of a head-to-head contest of the first index against the another index, in which the challenge is by a selection to a graphical user interface at the first electronic display device,
      receiving, over the communication network, from the another computing device acceptance of the challenge, in which the acceptance is by a selection to a graphical user interface at the another electronic display device, and
      displaying, over the communication network, at the first electronic display device and the another electronic display device respectively of the first computing device and the another computing device, indicia of a challenge binary option associated with a contest between the first index and the another index;
   before the end time, receiving, over the communication network, from a plurality of computing devices including the first computing device and the another computing device, a request to purchase a quantity of the first binary option and a quantity of the challenge binary option,
      wherein at a time before the end time, each of the first binary option and the challenge binary option is defined to settle at a future time to one of two possible values comprising a respective first final value and a second final value;
   before the end time, facilitating transacting a first trade and another trade comprising a purchase and sale respectively of the quantity of the first binary option and the quantity of the challenge binary option;
   determining a first rate of return for the first index by comparing a value of the first index at the end time to a value of the first index at the start time, and another rate of return for the another index by comparing a value of the another index at the end time to a value of the another index at the start time;
   determining at least one second rate of return for the at least one second index by comparing, for each of the at least one second index, a value of the respective second index at the end time to a value of the respective second index at the start time; and
   determining
      (i) a final value of the first binary option, in which determining the final value of the first binary option comprises one of:
         determining that the first binary option has a value equal to the first final value of the first binary option responsive to determining that the first rate of return for the first index is one of (a) higher than and (b) higher than or equal to each of the at least one second rate of return for the at least one second index; and
         determining that the first binary option has a value equal to the second final value of the first binary option responsive to determining that the first rate of return for the first index is one of (a) less than and (b) less than or equal to each of the at least one second rate of return for the at least one second index; and
      (ii) a final value of the challenge binary option, in which determining the final value of the challenge binary option comprises one of:
         determining that the challenge binary option has a value equal to the first final value of the challenge binary option responsive to determining that the first rate of return for the another index is one of (a) higher than and (b) higher than or equal to the first rate of return for the first index; and
         determining that the challenge binary option has a value equal to the second final value of the challenge binary option responsive to determining that the first rate of return for the another index is one of (a) less than and (b) less than or equal to the first rate of return for the first index.

20. A non-transitory computer-readable medium configured to store instructions which, when executed by at least one processor, control:

receiving, over a communication network, from a first computing device of a first user, a first specification of a first index comprising a first portfolio, the first specification defining one or more first trading products in the first portfolio;

receiving, over the communication network, from another computing device of another user different from the first user, another specification of another index comprising another portfolio, the another specification defining one or more another trading products in the another portfolio;

determining at least one second index comprising a respective at least one second portfolio, each of the at least one second portfolio comprising at least one second trading product;

monitoring progression of a period of time from a start time of the period of time to an end time of the period of time;

displaying, over the communication network, at a first electronic display device and another electronic display device associated with the first computing device and the another computing device, respectively, first indicia of a first binary option associated with the first index, another binary option associated with the another index, the at least one second index, and a current time of the progression of the period of time, the first indicia comprising information about the first index, information about the another index, information about the at least one second index, and the end time;

before the end time,
  receiving over the communication network, from the first computing device a challenge of a head-to-head contest of the first index against the another index, in which the challenge is by a selection to a graphical user interface at the first electronic display device,
  receiving, over the communication network, from the another computing device acceptance of the challenge, in which the acceptance is by a selection to a graphical user interface at the another electronic display device, and
  displaying, over the communication network, at the first electronic display device and the another electronic display device respectively of the first computing device and the another computing device, indicia of a challenge binary option associated with a contest between the first index and the another index;

before the end time, receiving, over the communication network, from a plurality of computing devices including the first computing device and the another computing device, a request to purchase a quantity of the first binary option and a quantity of the challenge binary option, wherein at a time before the end time, each of the first binary option and the challenge binary option is defined to settle at a future time to one of two possible values comprising a respective first final value and a second final value;

before the end time, facilitating transacting a first trade and another trade comprising a purchase and sale respectively of the quantity of the first binary option and the quantity of the challenge binary option;

determining a first rate of return for the first index by comparing a value of the first index at the end time to a value of the first index at the start time, and another rate of return for the another index by comparing a value of the another index at the end time to a value of the another index at the start time;

determining at least one second rate of return for the at least one second index by comparing, for each of the at least one second index, a value of the respective second index at the end time to a value of the respective second index at the start time; and determining
  (i) a final value of the first binary option, in which determining the final value of the first binary option comprises one of:
    determining that the first binary option has a value equal to the first final value of the first binary option responsive to determining that the first rate of return for the first index is one of (a) higher than and (b) higher than or equal to each of the at least one second rate of return for the at least one second index; and
    determining that the first binary option has a value equal to the second final value of the first binary option responsive to determining that the first rate of return for the first index is one of (a) less than and (b) less than or equal to each of the at least one second rate of return for the at least one second index; and
  (ii) a final value of the challenge binary option, in which determining the final value of the challenge binary option comprises one of:
    determining that the challenge binary option has a value equal to the first final value of the challenge binary option responsive to determining that the first rate of return for the another index is one of (a) higher than and (b) higher than or equal to the first rate of return for the first index; and
    determining that the challenge binary option has a value equal to the second final value of the challenge binary option responsive to determining that the first rate of return for the another index is one of (a) less than and (b) less than or equal to the first rate of return for the first index.

* * * * *